United States Patent [19]

Mowrey et al.

[11] Patent Number: 5,093,203

[45] Date of Patent: Mar. 3, 1992

[54] POLYCHLOROPRENE-BASED ADHESIVE SYSTEM

[75] Inventors: Douglas H. Mowrey, Pleasantville, Pa.; Natale M. Pontore, Troy, N.Y.

[73] Assignee: Lord Corporation, Erie, Pa.

[21] Appl. No.: 475,662

[22] Filed: Feb. 6, 1990

[51] Int. Cl.$^5$ .................. B32B 15/08; B32B 25/08; B32B 27/08

[52] U.S. Cl. ..................... 428/462; 156/307.5; 156/333; 428/465; 428/469; 428/492; 428/517

[58] Field of Search ............. 428/492, 462, 465, 524, 428/416, 517, 469; 156/307.5, 333, 335; 525/135; 524/104, 507; 523/409

[56] References Cited

U.S. PATENT DOCUMENTS

| | | | |
|---|---|---|---|
| 2,581,920 | 1/1952 | Kuhn | 428/462 |
| 2,610,910 | 9/1952 | Thomson | 156/335 |
| 2,635,088 | 4/1953 | Holmes | 525/135 |
| 2,900,292 | 8/1959 | Coleman et al. | 428/416 |
| 3,258,388 | 6/1966 | Coleman et al. | 156/307.5 |
| 3,258,389 | 6/1966 | Coleman et al. | 156/333 |
| 3,478,127 | 11/1969 | Petersen | 525/135 |
| 3,922,468 | 11/1975 | Burke et al. | 428/524 X |
| 4,119,587 | 10/1978 | Jazenski et al. | 524/104 |
| 4,463,110 | 7/1984 | Perlinski et al. | 523/409 |
| 4,769,413 | 9/1988 | Fleming et al. | 524/507 |

Primary Examiner—Thomas J. Herbert, Jr.
Attorney, Agent, or Firm—W. Graham Buie

[57] ABSTRACT

A rubber-metal adhesive system which contains a primer component and an overcoat component. The primer component includes a polychloroprene compound, a phenolic resin, and a metal oxide while the overcoat component preferably contains a nitroso compound, a halogenated polyolefin, and a metal oxide or salt. When applied between a metal surface and a rubber substrate under heat and pressure, the adhesive system provides a flexible rubber-metal bond which will withstand high temperature fluid environments.

19 Claims, No Drawings

POLYCHLOROPRENE-BASED ADHESIVE SYSTEM

FIELD OF THE INVENTION

This invention relates to the bonding of metal surfaces to rubber substrates with the use of appropriate adhesive compositions. More specifically, the present invention relates to an improved polychloroprene-based adhesive primer and corresponding adhesive system which provide for increased bond flexibility and increased bond resistance to high temperature fluid environments.

BACKGROUND OF THE INVENTION

Effective and reliable adhesive bonds between metal surfaces and rubber substrates are extremely important in automotive and industrial applications which utilize metal components bonded to rubber or elastomer substrates. Various technologies have been previously developed in an attempt to provide an effective rubber-metal bond which will withstand the various conditions encountered in these commercial applications. For example, U.S. Pat. No. 2,581,920 discloses the use of polymers of dichlorobutadiene and chlorinated rubber in rubber-metal adhesives. In addition, U.S. Pat. No. 2,900,292 discusses the bonding of rubber to metal with brominated 2,3-dichlorobutadiene-1,3 polymer. The adhesive composition may optionally contain a material that adheres to metal surfaces such as a thermosetting phenol-aldehyde resin or a halogenated rubber.

U.S. Pat. Nos. 3,258,388 and 3,258,389 disclose an adhesive composition containing a rubber adherent and a metal adherent such that the adhesive will bond metal to rubber upon heating under pressure. Various metal adherents include thermosetting phenol-aldehyde resins, polymers of ethylenically unsaturated materials, halogenated rubber such as chlorinated natural rubber or chlorinated polychloroprene. The rubber adherent basically consists of a poly-C-nitroso compound although various other rubber adhering components may be utilized such as vulcanizable olefins.

U.S. Pat. No. 4,769,413 discloses a metal coating composition which may be utilized as a primer in rubber-metal bonding. The composition consists of a blocked isocyanate-functional urethane prepolymer, a phenolic resin, and a halogenated resin such as halogenated rubber dispersed in an inert solvent.

Recent technological advances in automotive and industrial applications have resulted in relatively severe working environments for adhesively bonded rubber and metal components. For example, many fluid-filled engine mounts are being exposed to increasingly high temperatures such that the rubber-metal bond on the mount is exposed to very high temperature fluid environments. Furthermore, many adhesively bonded components are crimped or squeezed into desired shapes or configurations prior to use in a final application.

It has been found that many of the above adhesive systems containing halogenated rubbers such as chlorinated natural rubber cannot withstand the harsh conditions imposed by these environments. For example, in high temperature environments, many of the traditional rubber-metal bonding compositions will blister or rapidly corrode. In addition, the relatively brittle rubber-metal bonds formed from traditional compositions cannot withstand the crimping or squeezing required in many applications. A need therefore exists for a rubber-metal adhesive system which will withstand these increasingly demanding conditions.

SUMMARY OF THE INVENTION

The present invention is an improved polychloroprene-based adhesive system which produces a flexible rubber-metal bond which will withstand high temperature fluid environments. The invention is a twopart adhesive system containing a primer component and an overcoat component. The primer component contains a polychloroprene compound, a phenolic resin, and a metal oxide while the overcoat component preferably contains a nitroso compound, a halogenated polyolefin, and a metal oxide or salt. The primer component and the overcoat component are effectively applied between the metal surface and the rubber substrate to be bonded and the resulting rubber-metal assembly is heated under pressure in order to effect bonding. It has been surprisingly discovered that an adhesive system utilizing the polychloroprene compounds disclosed herein in combination with the other components of the present invention results in a flexible rubber-metal bond which exhibits unusually high resistance to high temperature fluid environments.

It is therefore an object of the present invention to provide a rubbermetal adhesive system which can be effectively utilized in the increasingly demanding environments of many automotive and industrial applications.

It is another object of the present invention to provide a rubbermetal adhesive system which is sufficiently flexible to withstand crimping and squeezing of the corresponding rubber-metal assembly.

It is yet another object of the present invention to provide a rubber-metal adhesive system which will withstand high temperature fluid environments.

DETAILED DESCRIPTION OF THE INVENTION

The adhesive system of the present invention contains a primer component and an overcoat component which can be applied under heat and pressure between a metal surface and a rubber substrate in order to produce a flexible rubber-metal bond which will withstand harsh conditions such as high temperature fluid environments.

The primer component of the present adhesive system comprises a polychloroprene compound, a phenolic resin, and a metal oxide. The polychloroprene compound can be any polymer based on at least 50 to 100 percent of 2-chlorobutadiene-1,3 monomer. The remainder of the polymer may contain monomers such as sulfur, methacrylic acid, acrylonitrile, 2,3-dichloro-1,3-butadiene and combinations thereof. The preferred polychloroprene compounds of the invention are non-post-chlorinated homopolymers of 2-chlorobutadiene-1,3 having a molecular weight in the range of 200,000 to 1,300,000, preferably 700,000 to 1,100,000. The preferred homopolymers typically contain from about 37 to 39 percent chlorine by weight and have a molecular structure containing from about 85 to 95 percent trans-1,4 segments. Non-post-chlorinated polymer herein refers to a polychloroprene compound that has not been chlorinated subsequent to the initial polymerization of the polymer. The polychloroprene compound is utilized in an amount from about 5 to about 40, preferably from about 20 to about 25 percent by weight of the primer component. The synthesis and availability of the present polychloroprene compounds are well known in the art.

The phenolic resin of the present invention can essentially be any heat-reactive phenolic resin. Typical phenolic resins include the organic solvent-soluble heat-reactive condensation product of an aldehyde having from 1 to 8 carbon atoms, such as formaldehyde, acetaldehyde, isobutyraldehyde, ethylhexaldehyde, and the like, with phenolic compounds such as phenol, o-cresol, m-cresol, p-cresol, mixed cresols, e.g., cresylic acid and m-cresol and/or p-cresol, xylenol, diphenylolproprane, p-butylphenol, p-tert-amylphenol, p-octylphenol, p,p'-dihydroxydiphenylether, and the like. Mixtures of dissimilar phenolic resins can also be used.

The phenolic resin will preferably be formed in a conventional manner from the condensation of from about 0.8 to about 5 mols of aldehyde per mol of phenolic compound in the presence of basic, neutral, or acidic catalysts to afford an organic solvent-soluble resin having a molecular weight in the range of from about 300 to about 2,000, preferably from about 300 to about 1,200. A particularly preferred phenolic resin is a mixture of a phenol aldehyde resin and a phenol formaldehyde resin modified with cresol. The phenolic resin is typically utilized in an amount from about 10 to about 70, preferably from about 30 to about 50 percent by weight of the primer component.

The metal oxide can be any known metal oxide such as zinc oxide, magnesium oxide, litharge, red lead, and combinations thereof, with zinc oxide being the preferred metal oxide. The metal oxide is typically utilized in an amount from about 1 to about 35, preferably from about 5 to about 20 percent by weight of the primer component.

The primer component of the invention can optionally contain other well-known additives including plasticizers, fillers, pigments, reinforcing agents and the like, in amounts employed by those skilled in the adhesive arts to obtain desired color and consistency. Typical additional additives include titanium dioxide, carbon black and silica.

The overcoat component can be any rubber-bonding composition, such as those disclosed in U.S. Pat. Nos. 2,900,292, 3,258,389, and 4,119,587, but preferably comprises a nitroso compound, a halogenated polyolefin, and a metal oxide or salt. The nitroso compound can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The present preferred nitroso compounds are the di-nitroso aromatic compounds, especially the dinitrosobenzenes and dinitrosonaphthalenes, such as the meta- or para-dinitrosobenzenes and the meta- or paradinitrosonaphthalenes. The nuclear hydrogen atoms of the aromatic nucleus can be replace by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

wherein Ar is selected from the group consisting of phenylene and naphthalene:

R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene. The nitroso compound component is typically utilized in an amount from about 1 to about 50, preferably from about 5 to about 35 percent by weight of the overcoat component.

The halogenated polyolefin of the overcoat component can essentially be any natural or synthetic halogenated polyolefin elastomer. The halogens employed in the halogenated polyolefinic elastomers are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Halogenated polyolefins and their preparation are well-known to those skilled in the art.

Representative halogenated polyolefins include chlorinated natural rubber, chlorine- and bromine-containing synthetic rubbers including polychloroprene, chlorinated polychloroprene, chlorinated polybutadiene, chlorinated butadiene styrene copolymers, chlorinated ethylene propylene copolymers and ethylene/propylene/non-conjugated diene terpolymers, chlorinated polyethylene, chlorosulfonated polyethylene, brominated poly(1,3-dichloro-1,3-butadiene), copolymers of α-chloroacrylonitrile and 2,3-dichloro-1,3-butadiene, chlorinated poly(vinyl chloride), and the like, including mixtures of such halogen-containing elastomers. Thus, substantially any of the known halogen-containing derivatives of natural and synthetic elastomers can be employed in the practice of this invention, including mixtures of such elastomers. At the present time, chlorosulfonated polyethylene and chlorinated natural rubber constitute preferred halogenated polyolefins for use in the present invention. The polyolefin is normally utilized in an amount from about 10 to about 99 percent by weight, preferably from about 30 to about 70 percent by weight of the overcoat component.

The metal oxide or salt of the overcoat component can be any metal oxide or salt such as zinc oxide, magnesium oxide, various lead salts or combinations thereof. The lead salts which are suitable for use in the present invention can be described broadly as polybasic lead salts of phosphorous acid and saturated and unsaturated organic dicarboxylic acids and acid anhydrides. Zinc oxide is the preferred metal oxide while particularly preferred lead salts include dibasic lead phosphite, dibasic lead phthalate, monohydrous tribasic lead maleate, tetrabasic lead fumarate, and mixtures thereof. The metal oxide or salt is typically utilized in an amount from about 1 to about 35, preferably from about 15 to about 20 percent by weight of the overcoat component.

The overcoat component of the invention can optionally contain other well-known additives including plasticizers, fillers, pigments, reinforcing agents and the like, in amounts employed by those skilled in the adhesive arts to obtain desired color and consistency. Typical additional additives include maleimide compounds (including all maleimide, bismaleimide and related compounds as described in U.S. Pat. No. 4,119,587) and phenolic epoxy resins having terminal epoxy functionality.

The components of the present invention are typically applied in liquid form by utilizing a variety of solvents to dissolve each respective component. Solvents useful for dissolving the primer component include various polar solvents such as ketones, aromatic solvents such as toluene, xylene and aliphatic solvents such as hexane or heptane, with methyl-ethyl ketone and methyl-isobutyl ketone being the preferred solvents for the primer component. The solvent for the primer component is utilized in an amount sufficient to provide a coating composition having a total solids content (TSC) of from about 5 to about 70 percent, preferably from about 15 to about 30 percent. Solvents useful for dissolving the overcoat component include various aromatic solvents such as xylene, toluene, chlorobenzene, dichlorobenzene and halogenated aliphatic hydrocarbons such as trichloroethylene, perchloroethylene, and propylene dichloride, with xylene and toluene being the preferred solvents for the overcoat component. The solvent for the overcoat component is utilized in an amount sufficient to provide a coating composition having a total solids content of from about 5 to about 70 percent, preferably from about 15 to about 30 percent.

The primer component is typically applied to the surface of the metal to be bonded after which the overcoat component is applied to the coated metal surface although in some applications involving the bonding of post-vulcanized rubber, it may be possible to apply the overcoat component directly to the rubber substrate.

In order to cure or crosslink the primer component and the overcoat component to create the permanent rubber-metal bond, the surface of the metal and the rubber substrate are brought together under a pressure of from about 20.7 to about 172.4 Mega Pascals (MPa), preferably from about 50 to about 150 MPa. The resulting rubber-metal assembly is simultaneously heated to a temperature of from about 140 to about 200 degrees C., preferably from about 150 to about 170 degrees C. The assembly should remain under the applied pressure and temperature for a period of from about 3 minutes to about 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The rubber which may be bonded to metal in accordance with the present invention may be selected from any of the natural rubbers and olefinic synthetic rubbers including polychloroprene, polybutadiene, neoprene, Buna-S, Buna-N, butyl rubber, brominated butyl rubber, and the like. The metals to which the rubber may be bonded may also be selected from any of the common structural metals such as iron, steel (including stainless steel), lead, aluminum, copper, brass, bronze, Monel metal, nickel, zinc, and the like.

The following examples are presented in order to further illustrate the invention but are not intended to limit in any matter the scope of the invention.

The components of the following examples were prepared from the ingredients listed below:

| | Primer A (from U.S. Pat. No. 4,769,413): | |
|---|---|---|
| | Ingredient | Wt. % of Total |
| 1. | Ketoxime-blocked isocyanate-functional urethane[a] | 15.0 |
| 2. | Chlorinated rubber[b] | 7.05 |
| 3. | Phenol formaldehyde, approx. 37% methylol @ 70% TSC | 5.73 |
| 4. | Phenol formaldehyde resin modified with 12.5% ortho-cresol @ 70% TSC | 5.0 |
| 5. | Zinc Oxide | 0.70 |
| 6. | Carbon Black | 0.73 |
| 7. | Silica | 1.25 |
| 8. | $TiO_2$ | 4.44 |
| 9. | Xylene | 18.15 |
| 10. | Methyl Isobutyl Ketone | 41.95 |

[a] An isocyanate-terminated urethane having a molecular weight of 3000 prepared from polycaprolactone and toluene blocked in a conventional manner using a slight excess of methyl ethyl ketoxime.
[b] Chlorinated polyisoprene rubber (approx. 65% Cl).

| | Primer B (present invention): | |
|---|---|---|
| | Ingredient | Wt. % of Total |
| 1. | Polychloroprene Homopolymer (960,000 MW, ~38% Cl) | 3.72 |

-continued

| | Primer B (present invention): | |
|---|---|---|
| | Ingredient | Wt. % of Total |
| 2. | Phenol formaldehyde, approx. 37% methylol @ 70% TSC | 5.62 |
| 3. | Phenol formaldehyde resin modified with 12.5% ortho-cresol @ 70% TSC | 5.0 |
| 4. | Zinc Oxide | 1.49 |
| 5. | Carbon Black | 0.60 |
| 6. | Silica | 1.04 |
| 7. | TiO₂ | 3.72 |
| 8. | Methyl-isobutyl ketone | 78.81 |

| | Covercoat for Primers A and B | |
|---|---|---|
| | Ingredient | Wt. % of Total |
| 1. | P-dinitrosobenzene | 10.8 |
| 2. | Chlorosulfonated polyethylene | 5.0 |
| 3. | Chlorinated natural rubber | 2.4 |
| 4. | Zinc Oxide | 5.4 |
| 5. | Carbon Black | 1.4 |
| 6. | Toluene | 75.0 |

The ingredients of each respective component were combined in a conventional manner using a Kady mill mixer.

EXAMPLE 1

Primer A was applied to grit-blasted 1010 cold rolled steel and allowed to dry at room temperature to provide a coating having a dry film thickness of 0.3 mils. The covercoat was applied to the coated steel and allowed to dry at room temperature to provide a second coating having a dry film thickness of 0.6 mils and a total coating thickness of 0.9 mils. The coated steel was bonded to a ¼" thick slab of Stock #1 natural rubber by compression molding at 330° F. for 15 minutes. The resulting rubber-metal assembly was then cooled to room temperature.

EXAMPLE 2

The coated steel of Example 1 was bonded to a ¼" slab of Stock #2 natural rubber by compression molding at 330° F. for 24 minutes.

EXAMPLE 3

A rubber-metal assembly was prepared according to Example 1 with Primer B as the primer component.

EXAMPLE 4

A rubber-metal assembly was prepared according to Example 2 with Primer B as the primer component.

FLEXIBILITY TEST

The rubber-metal assemblies of Examples 1–4 were prepared according to ASTM D-429. The assemblies were then bent to an angle of approximately 120° and the rubber was peeled away in order to inspect the flexibility of the adhesive. Flexibility was measured in terms of percent rubber retention (R) after bending. The results of the flexibility test are shown in Table 1 below.

TABLE 1

| Example | Flexibility Rating |
|---|---|
| 1 | 95% R |
| 2 | 83% R |
| 3 | 95% R |
| 4 | 90% R |

HIGH TEMPERATURE FLUID TEST

The rubber-metal assemblies of Examples 1 through 4 were exposed to 100% ethylene glycol at a temperature of 135° C. for 100 hours. Degradation of the rubber-metal bond was measured in terms of percent rubber retention (R), rubber-cement failure (RC), and cement-metal failure (CM). The results of the high temperature test are shown in Table 2 below.

TABLE 2

| Example | 24 Hours | 100 hours |
|---|---|---|
| 1 | 100% CM | 100% CM |
| 2 | 100% CM | 100% CM |
| 3 | 80% R | 60% R |
| 4 | 90% R | 70% R |

As can be seen from the data presented in Tables 1 and 2, the adhesive system of the present invention simultaneously provides for both flexibility and high temperature fluid resistance and therefore exhibits surprisingly superior properties when compared to prior adhesive systems.

What is claimed is:

1. An adhesively-bonded rubber-metal assembly prepared by applying a primer component and an overcoat component between a metal surface and a rubber substrate and forcing the surface against the substrate at a pressure of between about 20.7 and about 172.4 MPa at a temperature of between about 140 and about 200° C. for between about 3 and 60 minutes wherein the primer component comprises a polychloroprene compound, a phenolic resin, and a metal oxide.

2. An adhesively-bonded rubber-metal assembly according to claim 1 wherein the polychloroprene compound comprises a non-post chlorinated polymer based on at least 50 to 100 percent of 2-chlorobutadiene-1,3 monomer present in an amount of from about 5 to about 40 percent by weight, the phenolic resin comprises the reaction product of at least one aromatic hydroxy compound and an aldehyde having from 1 to 8 carbon atoms present in an amount of from about 10 to about 70 percent by weight, and the metal oxide comprises zinc oxide present in an amount of from about 1 to about 35 percent by weight of the primer component.

3. An adhesively-bonded rubber-metal assembly according to claim 2 wherein the overcoat component comprises m- or p-dinitrosobenzene present in an amount from about 1 to about 50 percent by weight, chlorosulfonated polyethylene or chlorinated natural rubber present in an amount from about 10 to about 99 percent by weight, and zinc oxide or dibasic lead phosphite present in an amount from about 1 to about 35 percent by weight of the overcoat component.

4. An adhesive system comprising a primer component and an overcoat component wherein the primer component comprises a polychloroprene compound, a phenolic resin, and a metal oxide.

5. An adhesive system according to claim 4 wherein the polychloroprene compound comprises a polymer based on at least 50 to 100 percent of 2-chlorobutadiene-1,3 monomer present in an amount from about 5 to about 40 percent by weight of the primer component.

6. An adhesive system according to claim 5 wherein the polychloroprene compound is a non-post-chlorinated homopolymer of 2-chlorobutadiene-1,3 having a molecular weight of from about 700,000 to about 1,100,000 and is present in an amount from about 20 to about 25 percent by weight of the primer component.

7. An adhesive system according to claim 4 wherein the phenolic resin comprises the reaction product of at least one aromatic hydroxy compound and an aldehyde having from 1 to 8 carbon atoms present in an amount from about 10 to about 70 percent by weight of the primer component.

8. An adhesive system according to claim 7 wherein the phenolic resin is a mixture of a phenol aldehyde resin and a phenol-aldehyde resin modified with cresol present in an amount from about 30 to about 50 percent by weight of the primer component.

9. An adhesive system according to claim 4 wherein the metal oxide comprises zinc oxide or magnesium oxide present in an amount from about 1 to about 35 percent by weight of the primer component.

10. An adhesive system according to claim 9 wherein the metal oxide is zinc oxide present in an amount from about 5 to about 20 percent by weight of the primer component.

11. An adhesive system according to claim 4 wherein the overcoat component comprises a nitroso compound, a halogenated polyolefin, and a metal oxide or salt.

12. An adhesive system according to claim 11 wherein the nitroso compound is m- or p-dinitrosobenzene present in an amount from about 1 to about 50 percent by weight of the overcoat component.

13. An adhesive system according to claim 12 wherein the nitroso compound is p-nitrosobenzene present in an amount from about 15 to about 20 percent by weight of the overcoat component.

14. An adhesive system according to claim 11 wherein the halogenated polyolefin is chlorosulfonated polyethylene or chlorinated natural rubber present in an amount from about 10 to about 99 percent by weight of the overcoat component.

15. An adhesive system according to claim 14 wherein the halogenated polyolefin is chlorosulfonated polyethylene present in an amount from about 30 to about 70 percent by weight of the overcoat component.

16. An adhesive system according to claim 11 wherein the metal oxide or salt is zinc oxide or dibasic lead phosphite present in an amount from about 1 to about 35 percent by weight of the overcoat component.

17. An adhesive system according to claim 16 wherein the metal oxide or salt is zinc oxide present in an amount from about 15 to about 20 percent by weight of the overcoat component.

18. An adhesive system comprising a primer component and an overcoat component wherein the primer component comprises a non-post chlorinated polymer based on at least 50 to 100 percent of 2-chlorobutadiene-1,3 monomers present in an amount from about 5 to about 40 percent by weight, the reaction product of at least one aromatic hydroxy compound and an aldehyde having from 1 to 8 carbon atoms present in an amount from about 10 to about 70 percent by weight, and zinc oxide present in an amount from about 1 to about 35 percent by weight of the primer component.

19. An adhesive system according to claim 18 wherein the overcoat component comprises m- or p-dinitrosobenzene present in an amount from about 1 to about 50 percent by weight, chlorosulfonated polyethylene or chlorinated natural rubber present in an amount from about 10 to about 99 percent by weight, and zinc oxide present in an amount from about 1 to about 35 percent by weight of the overcoat component.

* * * * *